(12) United States Patent
Perry (10) Patent No.: US 6,343,026 B1
(45) Date of Patent: Jan. 29, 2002

(54) CURRENT LIMIT CIRCUIT FOR INTERLEAVED CONVERTERS

(75) Inventor: Marty Perry, Tucson, AZ (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/711,338

(22) Filed: Nov. 9, 2000

(51) Int. Cl.[7] .............................................. H02M 7/5395

(52) U.S. Cl. ........................... 363/65; 363/97; 323/272

(58) Field of Search ............................... 323/272, 282, 323/283; 363/21.12, 21.13, 21.18, 65, 97

(56) References Cited

U.S. PATENT DOCUMENTS

| 4,905,120 A | * | 2/1990 | Grembowicz et al. ...... 323/272 |
| 5,477,132 A | * | 12/1995 | Canter et al. .................. 363/65 |
| 6,023,154 A | * | 2/2000 | Martinez ..................... 323/282 |
| 6,055,169 A | * | 4/2000 | Bowman et al. ............... 363/65 |
| 6,211,657 B1 | * | 4/2001 | Goluszek ..................... 323/272 |

* cited by examiner

Primary Examiner—Jeffrey Sterrett
(74) Attorney, Agent, or Firm—Kirkpatrick & Lockhart LLP (57) ABSTRACT

A current limit circuit for a power supply including first and second interleaved power converters. The current limit circuit includes a peak detection circuit connected to a current sensing circuit of the power supply, a sample/hold circuit connected to the peak detection circuit, and an averaging filter circuit connected to the sample/hold circuit.

32 Claims, 7 Drawing Sheets

CURRENT LIMIT CIRCUIT FOR INTERLEAVED CONVERTERS

CROSS-REFERENCE TO RELATED APPLICATIONS

Not Applicable.

STATEMENT REGARDING FEDERALLY-SPONSORED RESEARCH AND DEVELOPMENT

Not Applicable.

BACKGROUND OF INVENTION

1. Field of Invention

The present invention relates generally to power conversion electronics and, more particularly, to current limit circuits for interleaved power converters.

2. Description of the Background

DC-to-DC power converters are power processing circuits that convert an unregulated input DC voltage to a regulated DC output voltage. Switched-mode DC-to-DC power converters typically include an inverter, a transformer having a primary winding coupled to the inverter, and a rectifying circuit coupled to a secondary winding of the transformer. The inverter typically includes a pulse width modulated (PWM) switching device, such as a field effect transistor (FET), that converts the DC input voltage to an alternating voltage, which is magnetically coupled from the primary winding of the transformer to the secondary winding. Conduction of the PWM switching device is regulated by a PWM control circuit. The rectifying circuit rectifies the alternating voltage on the secondary winding to generate a desired DC output voltage. The DC output voltage of the power converter, which is used to power a load, is typically regulated by varying the duty cycle of the PWM control signal from the PWM control circuit applied to the control terminal of the PWM switching device.

If the load develops a short or otherwise draws too much current, an overload condition occurs that could damage the load or the converter. Consequently, overload protection, which limits the maximum output current of a power supply in order to protect the load and/or power supply, is a typically required element of a power converter. Overload protection is ordinarily realized with a current limit circuit. Typically, a current limit circuit senses the peak current on the primary side of the power converter. When an overload condition occurs, the current limit circuit outputs a signal to the PWM control circuit, causing the PWM control circuit to reduce the duty cycle of the PWM control signal supplied to the PWM switching device.

In theory, this approach limits the output current of the converter to a safe value. However, current limiting based on peak current control in a buck-boost type converter results in an overload response characteristic that is one of constant power. To effectively safeguard the power converter unit during an overload condition, therefore, additional control circuitry is needed. The functions of the additional control circuitry, however, typically result in a non-constant current response and are prone to several control problems.

In addition, it is difficult to effectively implement overload protection in interleaved mode converters. Interleaved, or multi-phase, power converters commonly include a set of two or more identical smaller power converters. These smaller converter "cells" are connected so that the output of the resultant larger converter represents a summation of the outputs of the individual cells. The cells are typically operated at a common frequency, but with the phase shifted between them so that the conversion switching occurs at regular intervals.

One important consideration in a multi-phase arrangement is the current balance between the parallel-connected converter cells. For example, if a power supply has two parallel-connected converter cells, typically each converter is designed to deliver half of the load current. In the event that one of the converters is not delivering half of the load current, the other converter has to "make up the difference." A converter that is forced to compensate for another converter may not be able to provide sufficient current to the load. In this event, the load equipment may not function properly at all.

Accordingly, in addition to overload protection, interleaved converters also require current sharing control circuitry. It is difficult to implement overload protection, however, in interleaved mode converters because the total output current is the sum of the output current of the individual converter cells. As such, the conduction interval of the rectifying circuit of one converter cell typically extends through the storage/conduction interval of another of the converter cells. Conventional techniques to implement current mode control and overload protection for interleaved converters, however, require current limiting and current sharing control circuitry for each of the individual converter cells, which is costly and inefficient.

Accordingly, there exists a need in the prior art for a technique to implement constant current overload function for interleaved buck-boost converters that is economical and efficient. There further exists a need for such a technique to be realized in a single circuit, and which inherently forces each converter cell in a multi-phase arrangement to share the total load current.

SUMMARY OF THE INVENTION

The present invention is directed to a current limit circuit for a power supply including first and second interleaved power converters. According to one embodiment, the current limit circuit includes a peak detection circuit connected to a current sensing circuit of the power supply, a sample/hold circuit connected to the peak detection circuit, and an averaging filter circuit connected to the sample/hold circuit.

According to another embodiment, the present invention is directed to a control circuit for a power supply including first and second interleaved power converters, wherein the first power converter includes a first pulse width modulated switching device and second power converter includes a second pulse width modulated switching device. According to one embodiment, the control circuit includes a current sensing circuit for sensing an input current of the first and second interleaved converters, a current limit circuit connected to the current sensing circuit for generating an output signal having a voltage value that is proportional to an average output current from the first and second interleaved power converters, a voltage control amplifier responsive to an output voltage of the power supply, and a pulse width modulated control circuit having an input terminal and first and second output terminals, wherein the input terminal is connected to both an output terminal of the current limit circuit and the output terminal of the voltage control amplifier, and wherein the first output terminal is connected to a control terminal of the first pulse width modulated switching device and the second output terminal is connected to a control terminal of the second pulse width modulated switching device.

According to another embodiment, the present invention is directed to a power supply. The power supply includes a first power converter including a first pulse width modulated switching device, a second power converter parallel-connected to the first power converter and including a second pulse width modulated switching device, a current sensing circuit for sensing an input current of the first and second converters, a current limit circuit connected to the current sensing circuit for generating an output signal having a voltage value that is proportional to an average output current from the first and second power converters, a voltage control amplifier responsive to an output voltage of the power supply, and a pulse width modulated control circuit having an input terminal and first and second output terminals, wherein the input terminal is connected to both an output terminal of the current limit circuit and the output terminal of the voltage control amplifier, and wherein the first output terminal is connected to a control terminal of the first pulse width modulated switching device and the second output terminal is connected to a control terminal of the second pulse width modulated switching device.

The current limit circuit of the present invention provides a constant current overload function for interleaved converters of, for example, the buck-boost derived type. In contrast to the prior art, the current limit circuit of the present invention may be realized in a single circuit that inherently forces each interleaved converter in a multi-phase arrangement to share total load current. According to one embodiment, the current limit circuit of the present invention develops a signal proportional to the average output current for an interleaved power supply. This signal may be used to provide average current mode control or overload protection with a constant current characteristic.

These and other benefits of the invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of an interleaved mode power supply. For example, certain details of the PWM control circuitry are not described herein. Those of ordinary skill in the art will recognize, however, that these and other elements may be desirable in a typical interleaved mode power supply. However, because such elements are well known in the art, and because they do not facilitate a better understanding of the present invention, a discussion of such elements is not provided herein.

Figure 1:
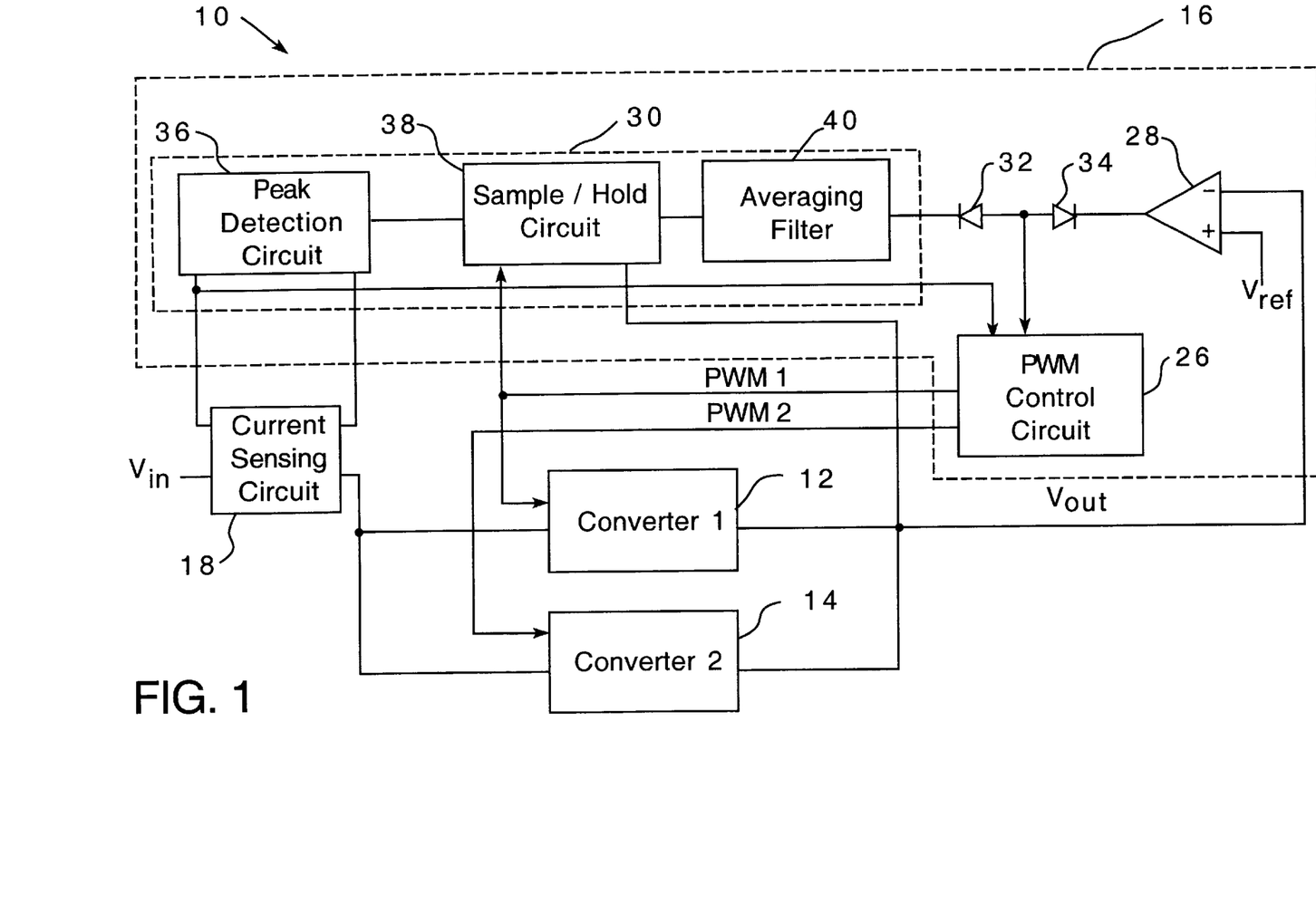
FIG. 1 is a combination schematic/block diagram of an interleaved mode power supply according to one embodiment of the present invention.

FIG. 1 is combination block/schematic diagram of an interleaved mode power supply 10 according to one embodiment of the present invention. The power supply 10 includes first and second DC—DC converters 12, 14, a control circuit 16, and a current sensing circuit 18. The first and second converters 12, 14 may be connected in parallel, and convert an unregulated DC input voltage (Vin) to a regulated DC output voltage (Vout), which may be used to power a load (not shown) connected to the output of the first and second converters 12, 14. The control circuit 16, as discussed hereinbelow, may regulate the operation of the first and second converters 12, 14 based on the output voltage (Vout) and based on the input current supplied to the first and second converters 12, 14. Although in FIG. 1 only two parallel-connected converters 12, 14 are shown, other embodiments of the present invention contemplate a greater number of parallel-connected converters.

The first and second converters 12, 14 may be, for example, switched-mode power converters that each convert the DC input voltage (Vin) to an output voltage which is combined to provide the common DC output voltage (Vout). According to one embodiment, each of the first and second converters 12, 14 may be, for example, a buck-boost power converter or a boost power converter. According to such an embodiment, each of the power converters 12, 14 may include a pulse width modulated (PWM) switch whose duty cycle is regulated by the control circuit 16, as described further hereinbelow, to regulate the DC output voltage (Vout). That is, the control circuit 16 may output a pair of pulse width modulation signals ($PWM_1$ and $PWM_2$) that are applied to the respective conduction control terminals of the PWM switches of the converters 12, 14. The parallel-connected converters 12, 14 may be operated in an interleaved mode, wherein the PWM control signals ($PWM_1$ and $PWM_2$) regulating the switching operation of the respective converters are out of phase. According to an embodiment including two parallel-connected converters, the PWM control signals may be, for example, 180° out of phase.

The current sensing circuit 18 senses the input current supplied to the interleaved converters 12, 14 and supplies a voltage signal indicative of the sensed input current to the control circuit 16 so that the control circuit 16 may control the operation of the converters 12, 14 based on the sensed input current. The current sensing circuit 18 is described in more detail hereinbelow with respect to FIG. 1a.

Figure 1A:
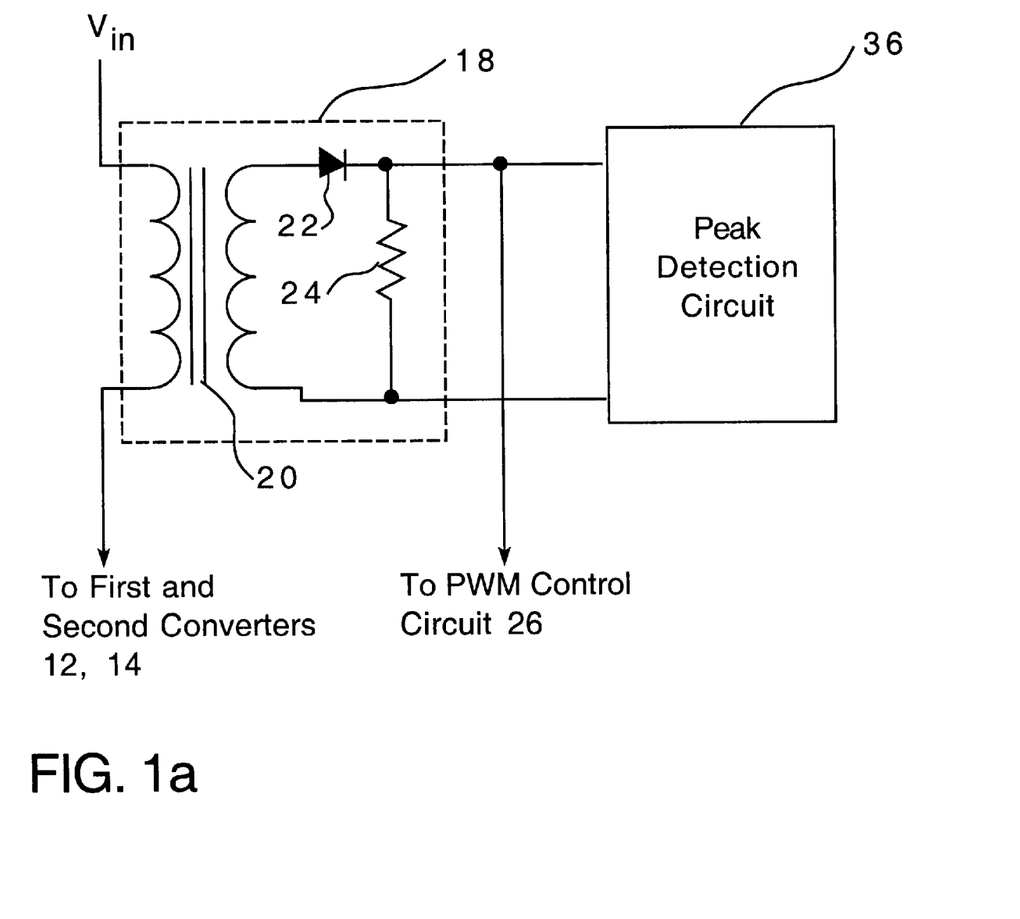
FIG. 1a is a schematic diagram of the current sensing circuit of the interleaved mode power supply of FIG. 1 according to one embodiment of the present invention.

The control circuit 16 may include a PWM control circuit 26, a voltage control amplifier 28, and a current limit circuit 30. As described further hereinbelow, the smaller of the output signals from the voltage control amplifier 28 and the current limit circuit 30 may be supplied to a first input terminal of the PWM control circuit 26 via oring diodes 32, 34. The PWM control circuit 26 may also receive a cyclically repeated ramp, or sawtooth, voltage waveform at a second input terminal. According to one embodiment, the sawtooth voltage waveform may be received from the current sensing circuit 18 as shown in FIG. 1a.

The PWM control circuit 26 generates the PWM signals PWM1, PWM2, which are used to regulate the first and second converters 12, 14. Based on a comparison of the output from either the current limit circuit 30 or the voltage control amplifier 28 with the sawtooth voltage waveform, the PWM control circuit 26 may regulate the duty cycles of the PWM signals PWM1, PWM2 to thereby regulate the operation of the first and second converters 12, 14 to realize a desired output voltage. According to one embodiment, the PWM control circuit 26 may be implemented using a commercially-available integrated circuit (IC) suitable for double-ended applications such as, for example, one of the UCC 3800 series of PWM, current-mode control ICs available from Texas Instruments.

According to one embodiment, the voltage control amplifier 28 may be embodied as an integrating operational amplifier (op-amp). According to such an embodiment, the voltage control amplifier 28 may have an inverting input terminal responsive to the DC output voltage (Vout) of the first and second converters 12, 14, and a non-inverting input terminal responsive to a reference voltage (Vref).

The current limit circuit 30, as illustrated in FIG. 1, may include a peak detection circuit 36, a sample/hold circuit 38, and an averaging filter circuit 40. As discussed further hereinbelow, the peak detection circuit 36 is responsive to the current sensing circuit 18. The peak detection circuit 36 may detect and store the highest current that occurs during the conduction interval of either of the first and second converters 12, 14. The sample/hold circuit 38, clocked with one of the PWM control signals (either PWM1 or PWM2), generates an output signal from the peak current value that is proportional to the instantaneous value of the output current from the first and second converters 12, 14. The averaging filter circuit 40 integrates the output from the sample/hold circuit 38 to a DC value. As such, the output voltage of the averaging filter circuit 40 may be proportional to the average current output from the first and second converters 12, 14.

The cathode terminal of the oring diode 32 is connected to the output terminal of the averaging filter circuit 40. The cathode terminal of the oring diode 34 is connected to the output terminal of the voltage control amplifier 28. The anode terminals of each of the oring diodes 32, 34 may be coupled to an input terminal of the PWM control circuit 26. As such, the output signal from the averaging filter circuit 40 or the voltage control amplifier 28 having the smaller instantaneous voltage value is input to the PWM control circuit 26. Accordingly, a constant current overload response characteristic may be implemented for the power supply 10.

FIG. 1a is a diagram of the current sensing circuit 18 according to one embodiment of the present invention. According to the illustrated embodiment, the current sensing circuit 18 includes a transformer 20 having a primary winding and a second winding, a diode 22, and a resistor 24. The primary winding of the transformer 20 may be coupled between the DC input voltage Vin and the first and second converters 12, 14. The secondary winding of the transformer 20 may be coupled to the peak detection circuit 36 of the control circuit 16 via the diode 22 and the resistor 24. The cathode terminal of the diode 22 may be coupled to the PWM control circuit 26 to provide the sawtooth waveform, as described hereinbefore. According to another embodiment, the transformer 20 may be replaced with a current sensing resistor.

Figure 2:
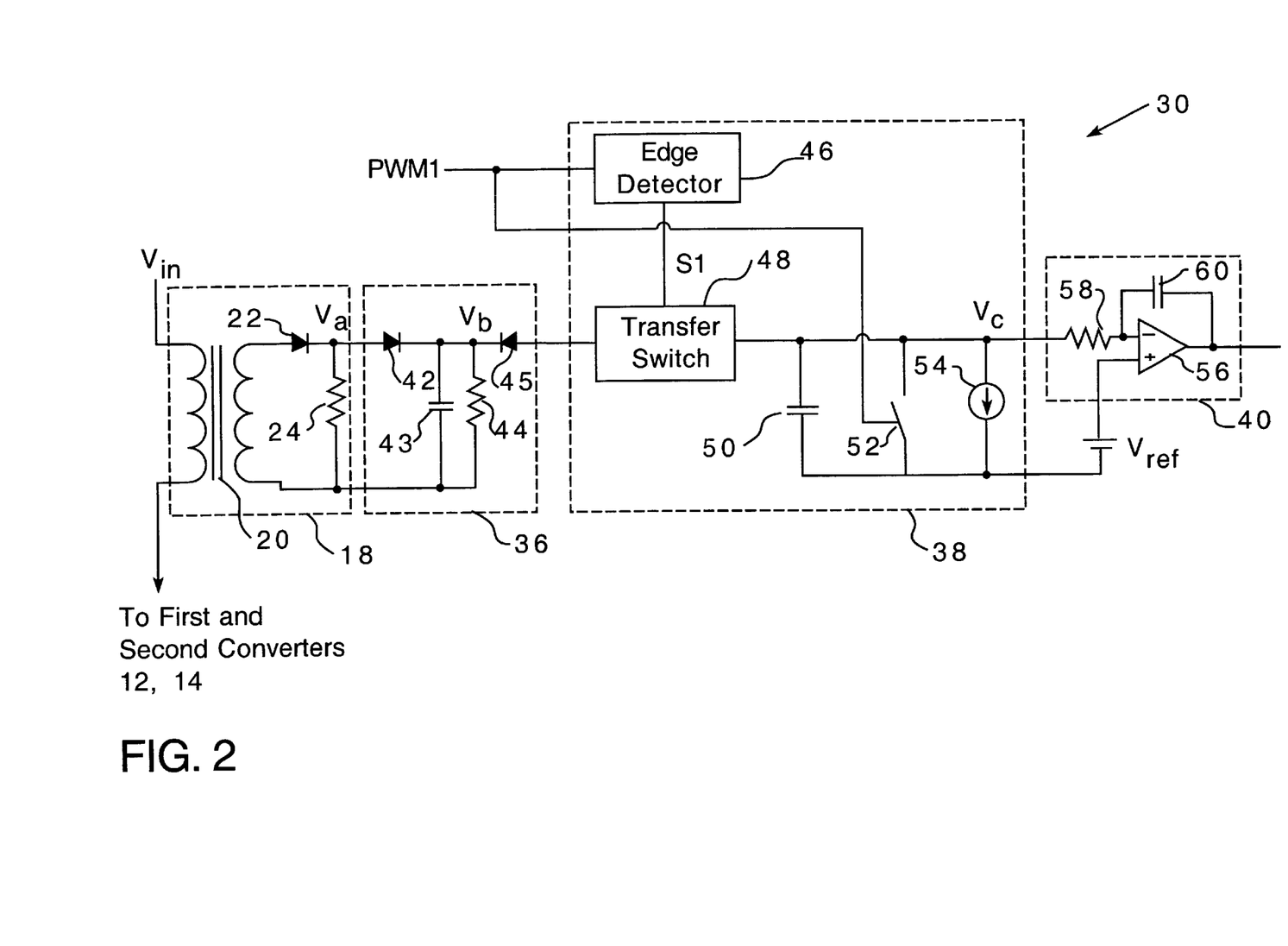
FIG. 2 is a combination schematic/block diagram of the current limit circuit of the power supply of FIG. 1 according to one embodiment of the present invention.

FIG. 2 is a diagram of the current limit circuit 30 according to one embodiment of the present invention. According to the illustrated embodiment, the peak detection circuit 36 includes a first diode 42, a capacitor 43, a resistor 44, and a second diode 45. The sample/hold circuit 38 includes an edge detector 46, a transfer switch 48, a capacitor 50, a switch 52, and a current sink 54, and is clocked with one of the PWM signals (such as PWM1, as illustrated in FIG. 2). The switch 52 may be a transistor such as, for example, a MOSFET. The current sink 54 may be any device providing a constant current and may be implemented with, for example, a current mirror, a transistor, or a resistor. The averaging filter circuit 40 includes an integrating operational amplifier 56 having a non-inverting input terminal responsive to a reference voltage Vref. In addition, the averaging filter circuit 40 may include a resistor 58 and a capacitor 60 configured to provide a feedback loop for the operational amplifier 56.

Figure 3A:
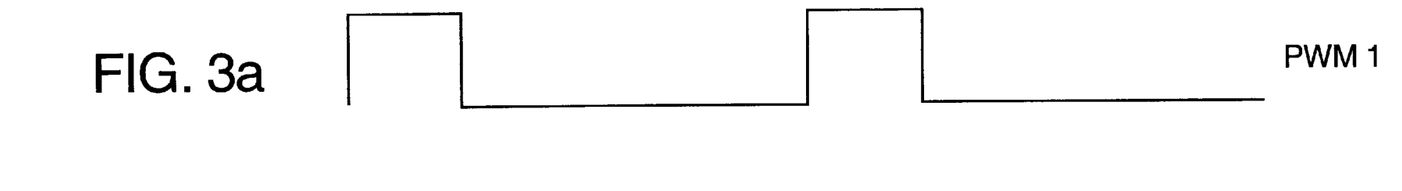
FIGS. 3a–d are voltage waveform diagrams illustrating the operation of the current limit circuit of FIG. 2 according to one embodiment of the present invention.
Figure 3B:
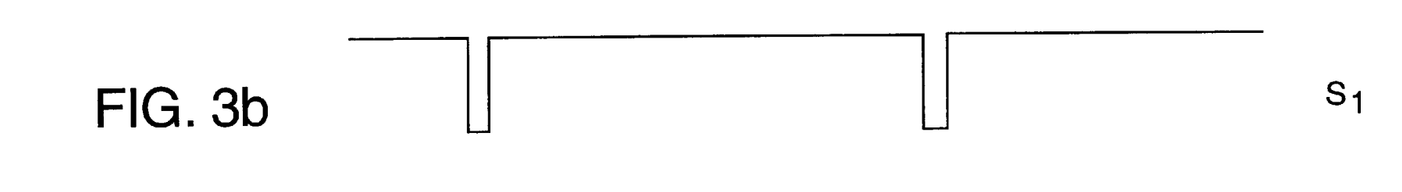
Figure 3C:
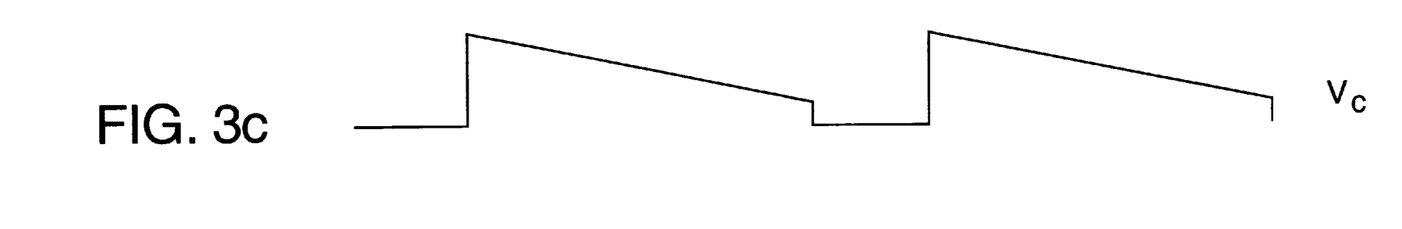
Figure 3D:
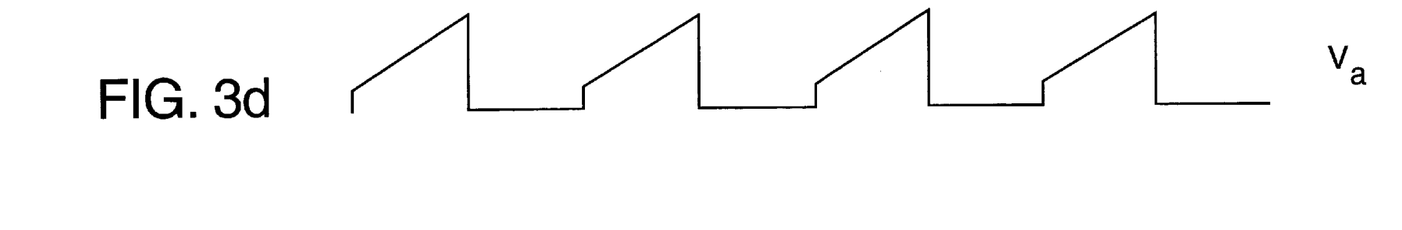

The operation of the current limit circuit 30 will be described in conjunction with the idealized voltage waveforms of FIGS. 3a–d. FIG. 3a is a diagram of the PWM1 voltage waveform supplied by the PWM control circuit 26 to the sample/hold circuit 38. FIG. 3b is a voltage waveform diagram of the control signal (S1) supplied from the edge detector 46 of the sample/hold circuit 38 to the transfer switch 48 of the sample/hold circuit 38. FIG. 3c is a diagram of the voltage waveform input to the averaging filter circuit 40, denoted as Vc. FIG. 3d is a diagram of the voltage waveform input to the peak detection circuit 36, denoted as Va.

The input current supplied by the source of the DC input voltage (Vin) to the first and second converters 12, 14 is sensed by the current sensing circuit 18. The voltage waveform at node Va, depicted in FIG. 3d, may thus be proportional to the primary current of the parallel-connected converters 12, 14. The peak detection circuit 36 stores a charge equal to the voltage of highest peak of the voltage waveform Va in the capacitor 43.

The edge detector 46 receives the control signal PWM1, illustrated in FIG. 3a, and may produce an output signal S1, illustrated in FIG. 3b, having a narrow low-voltage state synchronized to the falling edge of the PWM1 signal. The switch 52 of the sample/hold circuit 38 may also be clocked with, for example, the PWM1 signal. The current sink 54 may be configured to provide a current proportional to the output voltage Vout of the first and second converters 12,14.

The transfer switch 48 transfers the voltage across the capacitor 43 of the peak detection circuit 36 to the capacitor 50 of the sample/hold circuit 38. Accordingly, when the transfer switch 48 is turned off by the control signal S1 from the edge detector 48, the voltage on the capacitor 43 of the peak detection circuit 36 is transferred to the capacitor 50 of the sample/hold circuit 38. The transfer switch 48 may be implemented using, for example, a transistor connected between the capacitor 43 and the capacitor 50. According to another embodiment of the present invention, the transfer switch 48 may be a circuit as described further hereinbelow in conjunction with FIG. 4.

The switch 52 discharges the capacitor 50 when closed, which corresponds to the energy storage interval of the first converter 12 (i.e., when the PWM1 signal is at a high voltage). The current sink 54 discharges the capacitor 50 when the switch 52 is open, which corresponds to the energy delivery interval of the first converter 12 (i.e., when the PWM1 signal is at a low voltage). Consequently, an analog voltage waveform Vc, illustrated in FIG. 3c, is created which is proportional to the output current of the first and second converters 12, 14.

The averaging filter circuit 40 may integrate the waveform Vc to generate a voltage waveform proportional to the average output current from the first and second converters 12, 14. As discussed hereinbefore, the oring diodes 32, 34 may supply the smaller of the output signals from the averaging filter circuit 40 and the voltage control amplifier 28 to the PWM control circuit 26. When an overcurrent condition occurs, the output of the averaging filter circuit 40 is coupled to the PWM control circuit 26 via the oring diodes 32, 34, reducing the duty cycle, thereby forcing the output current to be controlled to a predetermined level. When the average value of Vc is equal to the value of Vref, the operational amplifier 56 will integrate negative, forcing the output current to be equal to a value proportional to Vref.

Figure 4:
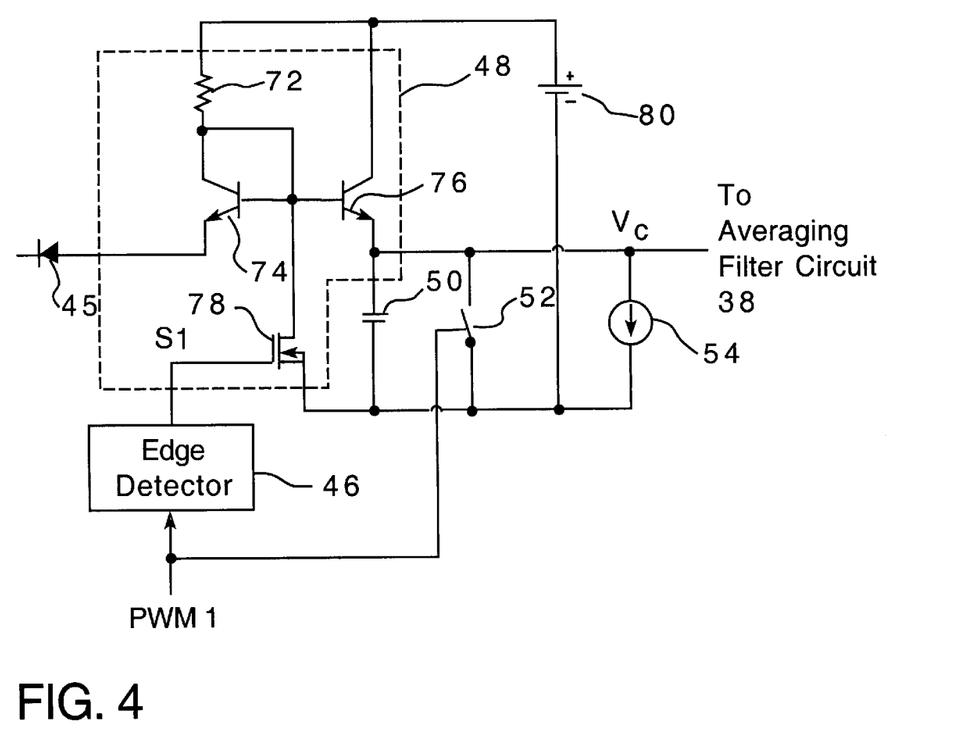
FIG. 4 is a combination schematic/block diagram of the sample/hold circuit of the current limit circuit of FIG. 2 according to one embodiment of the present invention.

FIG. 4 is a diagram of the sample/hold circuit 38 according to one embodiment of the present invention. According to the illustrated embodiment, the transfer switch 48 includes a resistor 72, and transistors 74, 76, 78. The transistors 74, 76 may be, for example, NPN bipolar junction transistors (BJTs), as illustrated in FIG. 4, configured to form a current mirror. The transistor 74 may be connected to the anode terminal of the second diode 45 of the peak detection circuit 36. The transistor 76 may be coupled to the capacitor 50, the switch 52, and the current sink 54. The transistor 78 may be, for example, a small signal n-channel depletion mode MOSFET. The conduction control terminal of the transistor 78 is responsive to the control signal S1 from the edge detector 46. The sample/hold circuit 36 may also include a voltage source 80, as illustrated in FIG. 4, to bias the current mirror.

The operation of the transfer switch 48 in transferring charge from the capacitor 43 of the peak detection circuit 36 to the capacitor 50 of the sample/hold circuit 38 will now be described. At the falling edge of the PWM1 control signal (see FIG. 3a), the switch 52 is turned off. In addition, the control signal S1 (see FIG. 3b) turns off the transistor 78 for a brief interval. While the control signal S1 is at a low voltage (i.e., while the transistor 78 is non-conductive), the current mirror comprising transistors 74, 76 turns on, forcing the voltage at node Vc (see FIG. 3c) to be the value of the voltage at node Vb plus the voltage drop of the second diode 45 of the peak detection circuit 36. The addition of the voltage drop of the second diode 45 of the peak detection circuit 36 compensates for the voltage drop of the first diode 42 of the peak detection circuit 36 (see FIG. 2). The timing interval and the component values may be designed such that the error term due to the charge rate of the capacitor 43 of the peak detection circuit 36 is minimal and may be ignored. Subsequently, when the control signal S1 returns to a high voltage level, the transistor 78 turns on, causing the nodes Vb and Vc to be disconnected, thereby allowing the voltage at node Vc to develop as depicted in FIG. 3c.

The sample/hold circuit 38 of FIG. 4 thus permits the transfer of the voltage level of the capacitor 43 to the capacitor 50 free of gate current pedestal. That is, because of the parasitic capacitance between the gate, source, and drain terminals of a MOSFET, if a MOSFET were connected between the nodes Vb and Vc, a charge pedestal would be added to the transfer level, thereby creating an error term. In addition, the sample/hold circuit 38 of FIG. 4 has the added advantage that it provides compensation for the voltage drop of the first diode 42 of the peak detection circuit 36. Furthermore, because the transistor 78 is ground referenced, the sample/hold circuit 38 of FIG. 4 provides the further advantage of greatly simplifying the design of the edge detector 46.

According to another embodiment of the present invention, the control signal S1 output by the edge detector 46 may have a narrow, high voltage pulse when the PWM1 signal transitions low. According to such an embodiment, the transfer switch 48 may be configured to transfer the voltage from the capacitor 43 to the capacitor 50 when the control signal S1 transitions to a high voltage.

Figure 5:
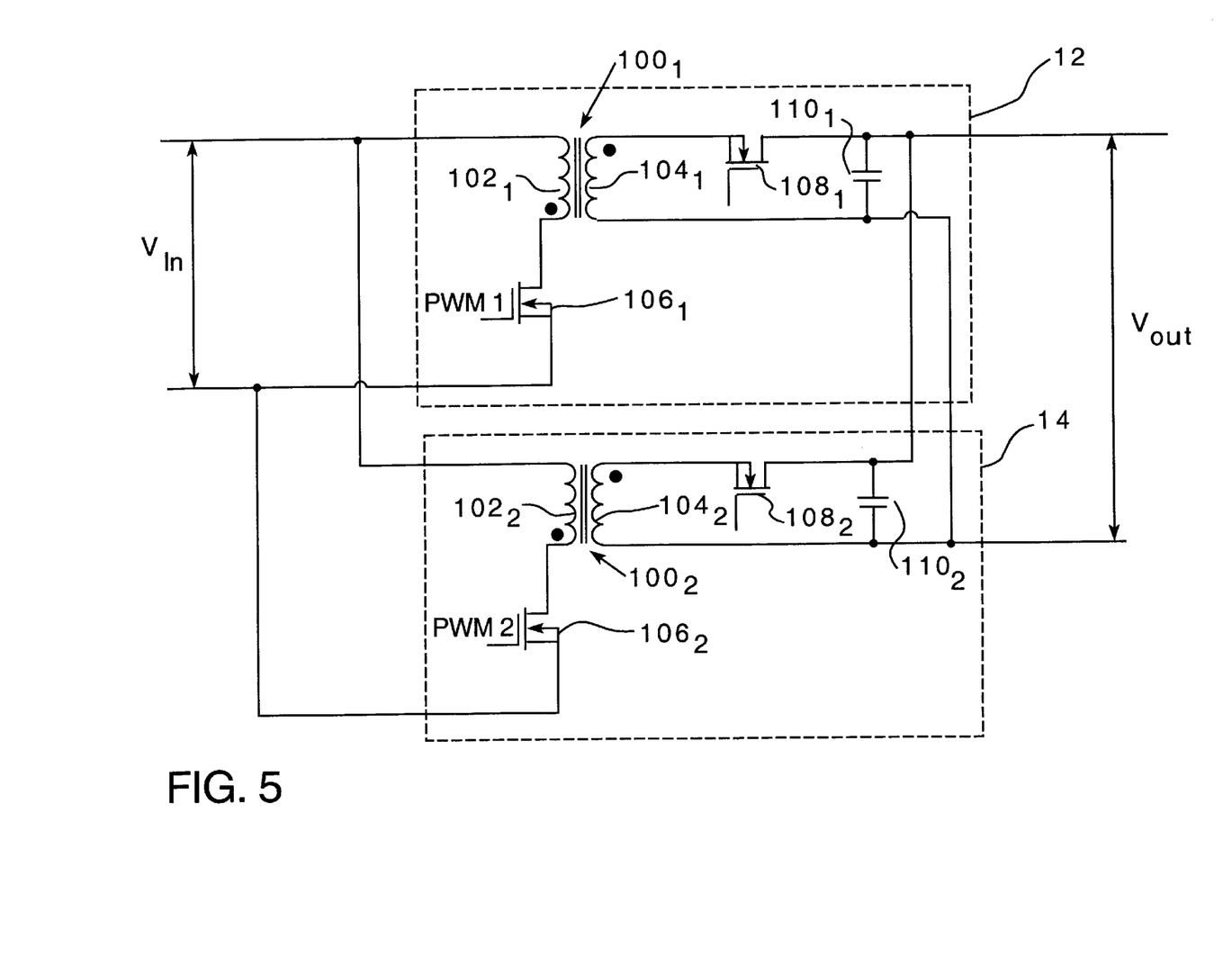
FIG. 5 is a schematic diagram of the parallel-connected converters of the power supply of FIG. 1 according to one embodiment of the present invention.

As discussed hereinbefore, the first and second converters 12, 14 may be buck-boost derived power converters. FIG. 5 is a schematic diagram of the first and second converters 12, 14 according to such an embodiment. Each converter 12, 14 may include a transformer $100_{1-2}$ having a primary winding $102_{1-2}$ and a secondary winding $104_{1-2}$. Each converter 12, 14 may also include a primary input power switch $106_{1-2}$ for cyclically coupling the input voltage Vin to the primary winding $102_{1-2}$ of the respective transformers $100_{1-2}$. Conduction of the primary input power switches $106_{1-2}$ is controlled respectively by the PWM control signals (PWM1 and PWM2) from the PWM control circuit 26 of the control circuit 16. As discussed hereinbefore, the PWM control signals PWM1, PWM2 may be out of phase such as, for example, 180° out of phase.

Each converter 12, 14 may also include a rectifying circuit comprising, for example, a rectifying device $108_{1-2}$ and an output capacitor $110_{1-2}$. The rectifying devices $108_{1-2}$ may be, for example, synchronous rectifier (SR) MOSFETs as illustrated in FIG. 5. According to another embodiment, the rectifying devices $108_{1-2}$ may be diodes. For an embodiment in which the rectifying devices $108_{1-2}$ are SRs, the SRs may be, for example, control-driven or self-driven, as is known in the art. For an embodiment in which the rectifying devices $108_{1-2}$ are self-driven SRs, each converter 12, 14 may include a gate drive circuit (not shown) for controlling the conduction of the SRs. The operation of such a buck-boost derived power converter is known in the art, and therefore will not be described further herein. For an embodiment of the present invention in which the power converters 12, 14 are boost derived converters, the current sink 54 of the sample/hold circuit 38 may be configured to provide a current proportional to the difference between the input voltage Vin and the output voltage Vout.

Figure 6:
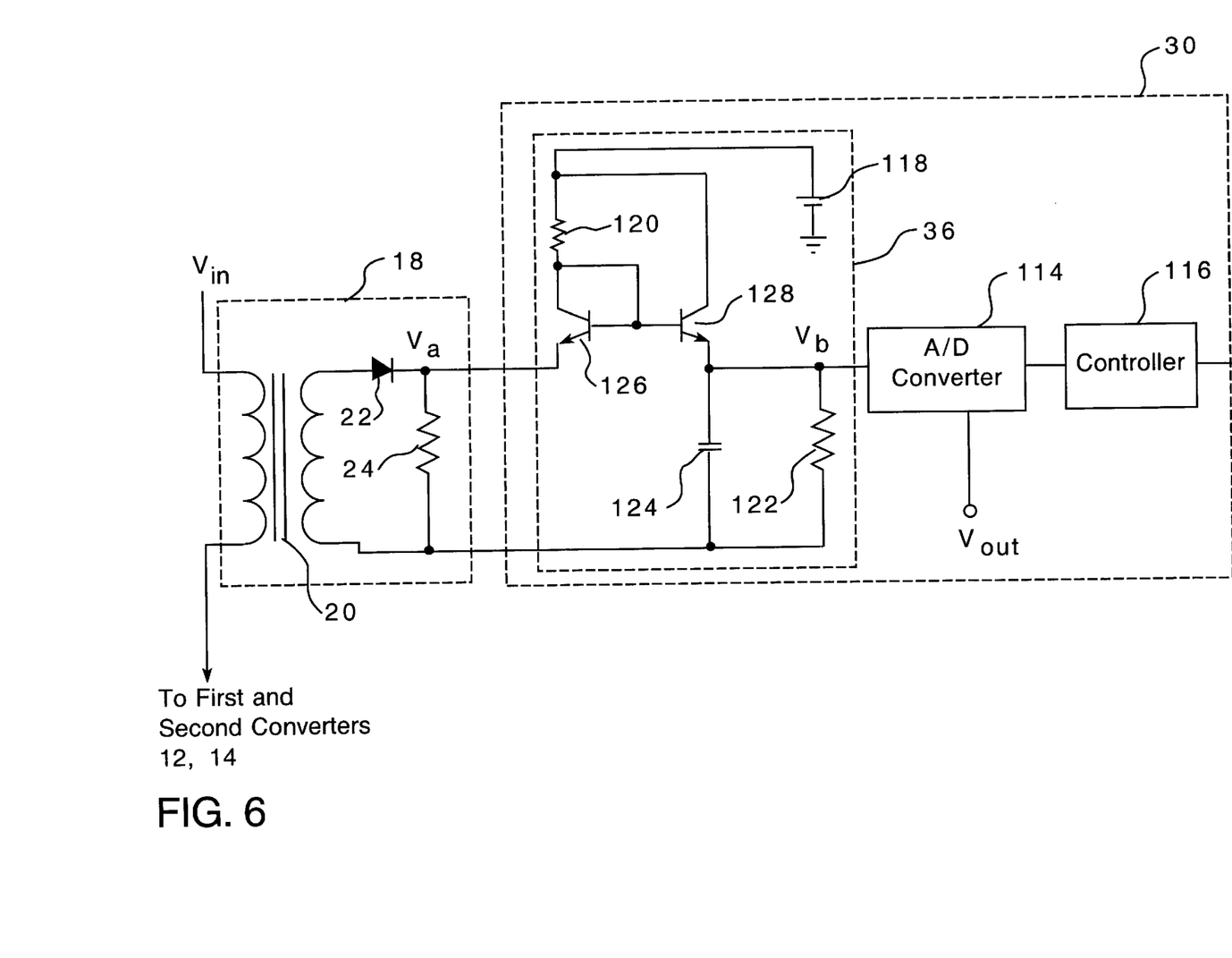
FIG. 6 is a combination schematic/block diagram of the current limit circuit of the power supply of FIG. 1 according to another embodiment of the present invention.

FIG. 6 is a diagram of the current limit circuit 30 according to another embodiment of the present invention. The current limit circuit 30 includes the peak detection circuit 36, an analog-to-digital (A/D) converter 114, and a controller 116. According to the illustrated embodiment, the peak detection circuit 36 may include a power source 118, resistors 120, 122, a capacitor 124, and transistors 126, 128. The transistors 126, 128 may, for example, be NPN bipolar junction transistors (BJT's), as illustrated in FIG. 6, configured to form a current mirror. The transistors 126, 128 force the voltage at node Vb to be equal to the voltage at node Va. The peak detection circuit 36, as illustrated in FIG. 6, is inherently voltage drop and temperature compensated, and allows for a wide control range since there is no voltage drop between node Va and node Vb.

The A/D converter 114 may include a first input terminal connected to an output terminal of the peak detection circuit 36, a second input terminal responsive to a voltage proportional to the output voltage Vout of the first and second power converters 12, 14, and an output terminal connected to the controller 116. The A/D converter 114 may convert the analog voltage at node Vb to a digital value. The controller 116 may then compute the average value of waveform Vc (see FIG. 3c) from the digital value output from the A/D converter 114 according to a coded algorithm. The output of the controller 116 may be connected to the PWM control circuit 26 via the oring diode 32, as discussed hereinbefore. According to one embodiment, the controller 116 may be, for example, a digital signal processor (DSP) or an application specific integrated circuit (ASIC), programmed to output the appropriate value for the average of the waveform Vc from the digital value of the voltage at node Vb.

According to another embodiment, the present invention is directed to a method of current detection for a plurality of multi-phased power converters. The plurality of multi-phased power converters may include a first multi-phase power converter similar to the first converter 12, and a second multi-phase power converter similar to the second converter 14. The method includes sensing a first input current to the first multi-phase power converter and sensing a second input current to the second multi-phase power converter. This may be performed with the current sensing circuit, as described hereinbefore. Next, the method includes storing a voltage corresponding to the highest peak input current occurring during the conduction intervals of the parallel-connected converters in a first storage element, such as the capacitor 43 of the peak detection circuit 36. The conduction interval of a converter, such as a converter similar to the converter 12, may correspond, for example, to the time period that the PWM1 control signal (see FIG. 3$a$) is at a high level, thereby causing the PWM1 switching device 106$_1$ (see FIG. 5) to conduct, thereby coupling the input voltage Vin to the primary winding of the transformer 100$_1$. Subsequently, at the end of the conduction interval, i.e., when the PWM1 control signal transitions to a low voltage, the voltage across the first storage element is transferred to a second storage element, such as the capacitor 50 of the sample/hold circuit 38. The function may be performed, for example, by the transfer switch 48. Thereafter, the method includes discharging the second storage element during an energy delivery interval of the first converter, i.e., the time period during which the PWM switching device 106$_1$ is non-conductive, thus causing energy stored in the transformer 100$_1$ to be supplied to the rectification circuit of the converter 12. This function may be performed by the sample/hold circuit 38, as described hereinbefore. The method may also include averaging the voltage of the second storage element. This may be performed by the averaging filter circuit 40, as described hereinbefore.

In a multi-phase arrangement including more than two parallel-connected converters, where the conduction intervals of the converters overlap, the sensing circuits from each converter may be, for example, diode-ored to the peak detection circuit 36.

Although the present invention has been described herein with respect to certain embodiments, those of ordinary skill in the art will recognize that many modifications and variations of the present invention may be implemented. For example, the transformers 100$_{1-2}$ of the power converters 12, 14 may include multiple primary, secondary, or tertiary windings. In addition, the power converters 12, 14 may include an active clamp circuit coupled to, for example, any one of the primary, secondary, or tertiary windings. The foregoing description and the following claims are intended to cover all such modifications and variations.

What is claimed is:

1. A current limit circuit for a power supply including first and second interleaved power converters, comprising:
   a peak detection circuit connected to a current sensing circuit of the power supply;
   a sample/hold circuit connected to the peak detection circuit; and
   an averaging filter circuit connected to the sample/hold circuit.

2. The current limit circuit of claim 1, wherein:
   the peak detection circuit is for storing a first voltage corresponding to a peak input current to the first and second interleaved power converters;
   the sample/hold circuit is for generating from the first voltage a first output signal having a voltage value that is proportional to an instantaneous value of an output current from the first and second interleaved power converters; and
   the averaging filter circuit is for generating from the first output signal a second output signal having a voltage value that is proportional to an average output current from the first and second interleaved power converters.

3. The current limit circuit of claim 1, wherein the peak detection circuit includes:
   a capacitor;
   a resistor connected in parallel with the first capacitor;
   a first diode having an anode terminal connected to the current sensing circuit and a cathode terminal connected to the capacitor; and
   a second diode having an anode terminal connected to the sample/hold circuit and a cathode terminal connected to the resistor.

4. The current limit circuit of claim 1, wherein the sample/hold circuit includes:
   an edge detector responsive to a pulse width modulated control signal, wherein a switching device of the first power converter is responsive to the pulse width modulated control signal;
   a second capacitor;
   a transfer switch connected between an output terminal of the peak detection circuit and the second capacitor, wherein the transfer switch is responsive to an output signal from the edge detector;
   a switch having a conduction path connected in parallel with the second capacitor, wherein the switch is responsive to the pulse width modulated control signal; and
   a current sink connected in parallel with the second capacitor.

5. The current limit circuit of claim 4, wherein the transfer switch includes:
   a current mirror connected to the output terminal of the peak detection circuit; and
   a transistor having first and second terminals and a control terminal, wherein the first and second terminals define a conduction path therebetween, and wherein the first terminal is connected to the current mirror, the second terminal is connected to the second capacitor, and the control terminal is responsive to the output signal from the edge detector.

6. The current limit circuit of claim 1, wherein the averaging filter circuit includes an operational amplifier having a first input terminal connected to an output terminal of the sample/hold circuit.

7. The current limit circuit of claim 1, wherein the first and second interleaved power converters are selected from the group consisting of buck-boost power converters and boost power converters.

8. A control circuit for a power supply including first and second interleaved power converters, wherein the first power converter includes a first pulse width modulated switching device and the second power converter includes a second pulse width modulated switching device, the control circuit comprising:
   a current sensing circuit for sensing an input current of the first and second interleaved converters;

a current limit circuit connected to the current sensing circuit for generating an output signal having a voltage value that is proportional to an average output current from the first and second interleaved power converters;

a voltage control amplifier responsive to an output voltage of the power supply; and a pulse width modulated control circuit having an input terminal and first and second output terminals, wherein the input terminal is connected to both an output terminal of the current limit circuit and the output terminal of the voltage control amplifier, and wherein the first output terminal is connected to a control terminal of the first pulse width modulated switching device and the second output terminal is connected to a control terminal of the second pulse width modulated switching device.

9. The control circuit of claim 8, further comprising:

a first oring diode having an anode terminal connected to the input terminal of the pulse width modulated control circuit and a cathode terminal connected to the output terminal of the current limit circuit; and a second oring diode having an anode terminal connected to the input terminal of the pulse width modulated control circuit and a cathode terminal connected to the output terminal of the voltage control amplifier.

10. The control circuit of claim 8, wherein the current sensing circuit includes a transformer having a primary winding and a secondary winding, wherein the primary winding is connected to the first and second interleaved power converters and the secondary winding is connected to the current limit circuit.

11. The control circuit of claim 8, wherein the current limit circuit includes:

a peak detection circuit connected to the current sensing circuit;

a sample/hold circuit connected to the peak detection circuit; and an averaging filter circuit connected between the sample/hold circuit and the input terminal of the pulse width modulated control circuit.

12. The control circuit of claim 11, wherein:

the peak detection circuit is for storing a first voltage corresponding to a peak input current to the first and second interleaved power converters;

the sample/hold circuit is for generating from the first voltage a first output signal having a voltage value that is proportional to an instantaneous value of an output current from the first and second interleaved power converters; and the averaging filter circuit is for generating from the first output signal a second output signal having a voltage value that is proportional to an average output current from the first and second interleaved power converters.

13. The control circuit of claim 8, wherein the current limit circuit includes:

a peak detection circuit connected to the current sensing circuit;

an A/D converter connected to the peak detection circuit and responsive to a voltage proportional to an output voltage of the power supply; and a controller connected between the A/D converter and the input terminal of the pulse width modulated control circuit.

14. The control circuit of claim 13, wherein the peak detection circuit includes a current mirror between the current sensing circuit and the A/D converter.

15. The current limit circuit of claim 14, wherein:

the peak detection circuit is for storing a first analog voltage corresponding to a peak input current to the first and second interleaved power converters;

the A/D converter is for converting the first analog voltage to a digital value; and the controller is for generating from the digital value from the A/D converter an analog output signal having a voltage value that is proportional to an average output current from the first and second interleaved power converters.

16. A control circuit for a power supply including first and second interleaved power converters, wherein the first power converter includes a first pulse width modulated switching device and second power converter includes a second pulse width modulated switching device, the control circuit comprising:

a current sensing circuit for sensing an input current of the first and second interleaved converters;

a peak detection circuit connected to the current sensing circuit;

a sample/hold circuit connected to an output terminal of the peak detection circuit;

an averaging filter circuit connected to an output terminal of the sample/hold circuit;

a voltage control amplifier responsive to an output voltage of the power supply; and a pulse width modulated control circuit having an input terminal and first and second output terminals, wherein the input terminal is connected to both an output terminal of the averaging filter circuit and the output terminal of the voltage control amplifier, and wherein the first output terminal is connected to a control terminal of the first pulse width modulated switching device and the second output terminal is connected to a control terminal of the second pulse width modulated switching device.

17. The control circuit of claim 16, wherein:

the peak detection circuit is for storing a first voltage corresponding to a peak input current to the first and second interleaved power converters;

the sample/hold circuit is for generating from the first voltage an output signal having a voltage value that is proportional to an instantaneous value of an output current from the first and second interleaved power converters; and the averaging filter circuit is for generating from the output signal of the sample/hold circuit an output signal having a voltage value that is proportional to an average output current from the first and second interleaved power converters.

18. The control circuit of claim 16, further comprising:

a first oring diode having an anode terminal connected to the input terminal of the pulse width modulated control circuit and a cathode terminal connected to the output terminal of the averaging filter circuit; and a second oring diode having an anode terminal connected to the input terminal of the pulse width modulated control circuit and a cathode terminal connected to the output terminal of the voltage control amplifier.

19. A power supply, comprising:

a first power converter including a first pulse width modulated switching device;

a second power converter parallel-connected to the first power converter and including a second pulse width modulated switching device;

a current sensing circuit for sensing an input current of the first and second converters;

a current limit circuit connected to the current sensing circuit for generating an output signal having a voltage value that is proportional to an average output current from the first and second power converters;

a voltage control amplifier responsive to an output voltage of the power supply; and a pulse width modulated control circuit having an input terminal and first and second output terminals, wherein the input terminal is connected to both an output terminal of the current limit circuit and the output terminal of the voltage control amplifier, and wherein the first output terminal is connected to a control terminal of the first pulse width modulated switching device and the second output terminal is connected to a control terminal of the second pulse width modulated switching device.

20. The power supply of claim 19, wherein the current limit circuit includes:

a peak detection circuit connected to the current sensing circuit;

a sample/hold circuit connected to the peak detection circuit; and an averaging filter circuit connected between the sample/hold circuit and the input terminal of the pulse width modulated control circuit.

21. The power supply of claim 20, wherein:

the peak detection circuit is for storing a first voltage corresponding to a peak input current to the first and second interleaved power converters;

the sample/hold circuit is for generating from the first voltage a first output signal having a voltage value that is proportional to an instantaneous value of an output current from the first and second interleaved power converters; and the averaging filter circuit is for generating from the first output signal a second output signal having a voltage value that is proportional to an average output current from the first and second interleaved power converters.

22. The power supply of claim 19, wherein the current limit circuit includes:

a peak detection circuit connected to the current sensing circuit;

an A/D converter connected to the peak detection circuit; and a controller connected between the A/D converter and the input terminal of the pulse width modulated control circuit.

23. The power supply of claim 22, wherein the peak detection circuit includes a current mirror connected between the current sensing circuit and the A/D converter.

24. The power supply of claim 22, wherein:

the peak detection circuit is for storing a first analog voltage corresponding to a peak input current to the first and second interleaved power converters;

the A/D converter is for converting the first analog voltage to a digital value; and the controller is for generating from the digital value from the A/D converter an analog output signal having a voltage value that is proportional to an average output current from the first and second interleaved power converters.

25. A control circuit for a power supply including first and second interleaved power converters, wherein the first power converter includes a first pulse width modulated switching device and second power converter includes a second pulse width modulated switching device, the control circuit comprising:

means for detecting a peak input current to the first and second interleaved power converters;

means for determining an instantaneous value of an output current from the first and second interleaved power converters from the peak input current; and means for determining an average output current from the first and second interleaved power converters based on the instantaneous value of an output current from the first and second interleaved power converters.

26. The control circuit of claim 25, further comprising means for modulating a duty cycle of the first and second pulse width modulated switching devices based on the average output current from the first and second interleaved power converter.

27. The control circuit of claim 26, further comprising means for sensing the input current to the first and second interleaved power converters.

28. A method for controlling a power supply including first and second interleaved power converters, wherein the first power converter includes a first pulse width modulated switching device and the second power converter includes a second pulse width modulated switching device, the method comprising:

detecting a peak input current to the first and second interleaved power converters;

determining an instantaneous value of an output current from the first and second interleaved power converters from the peak input current;

determining an average output current from the first and second interleaved power converters based on the instantaneous value of an output current from the first and second interleaved power converters.

29. The method of claim 28, further comprising modulating a duty cycle of the first and second pulse width modulated switching devices based on the average output current from the first and second interleaved power converter.

30. The method of claim 29, further comprising sensing the input current to the first and second interleaved power converters.

31. A method of current detection for a plurality of multi-phased power converters, comprising:

sensing an input current to the plurality of multi-phased power converters;

storing a voltage corresponding to a peak input current occurring during conduction intervals of the plurality of multi-phased power converters in a first storage element;

transferring the voltage from the first storage element to a second storage element at an end of a conduction interval for a first of the plurality of multi-phased power converters; and discharging the second storage element during an energy delivery interval of the first converter.

32. The method of claim 31, further comprising averaging the value of the voltage stored across the second storage element.

* * * * *